(12) United States Patent
Stark et al.

(10) Patent No.: US 8,083,175 B2
(45) Date of Patent: Dec. 27, 2011

(54) LOADING FITTING HAVING INTERSECTING HOLES IN THE WEB SIDE AND END

(75) Inventors: Richard L. Stark, Bothell, WA (US); Gerfried R. Achtner, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 391 days.

(21) Appl. No.: 11/938,153

(22) Filed: Nov. 9, 2007

(65) Prior Publication Data
US 2009/0121079 A1    May 14, 2009

(51) Int. Cl.
*B64C 1/16* (2006.01)
(52) U.S. Cl. .................... 244/35 R; 244/54; 244/100 R; 244/119; 244/131; 52/126.7; 248/241; 248/405; 248/674; 403/118
(58) Field of Classification Search ............... 244/35 R, 244/54, 100 R, 119, 121, 129.1, 131, 137.4; 248/241, 309.1, 405, 674, 59, 70; 403/118; 52/126.4, 126.7, 167.3
See application file for complete search history.

(56) References Cited

U.S. PATENT DOCUMENTS

| | | | | |
|---|---|---|---|---|
| 1,365,275 A * | 1/1921 | Robinson | | 244/54 |
| 2,026,157 A * | 12/1935 | Beecher | | 52/170 |
| 2,998,143 A * | 8/1961 | Sundin | | 212/238 |
| 3,004,636 A * | 10/1961 | Shane | | 52/710 |
| 3,222,017 A * | 12/1965 | Bobo | | 244/54 |
| 3,760,542 A * | 9/1973 | Haeussler | | 52/235 |
| 4,283,028 A * | 8/1981 | Wilke | | 244/54 |
| 6,511,570 B2 * | 1/2003 | Matsui | | 244/119 |
| 2006/0261215 A1 | 11/2006 | Schimmler et al. | | |
| 2007/0267541 A1 | 11/2007 | Honorato Ruiz et al. | | |

FOREIGN PATENT DOCUMENTS
DE  10 2007 021076 A1  11/2008
FR  2 887 849 A  1/2007

OTHER PUBLICATIONS

Niu, Michael, "Airframe Stress Analysis and Sizing", Conmilit, Press, 2$^{nd}$ ed. Chapter 9.9, pp. 343-370, 1999.
International Search Report dated Feb. 10, 2009 for PCT Application No. PCT/US2008/080191, 14 pages.

* cited by examiner

Primary Examiner — Robert Canfield
Assistant Examiner — Matthew J Smith
(74) Attorney, Agent, or Firm — Klintworth & Rozenblat IP LLC

(57) ABSTRACT

In one embodiment, a loading fitting includes at least one of an I, a T, and a J shaped cross-section having a flange attached to at least one supporting structure. In another embodiment, a method is disclosed for attaching a loading fitting to at least one supporting structure.

41 Claims, 8 Drawing Sheets

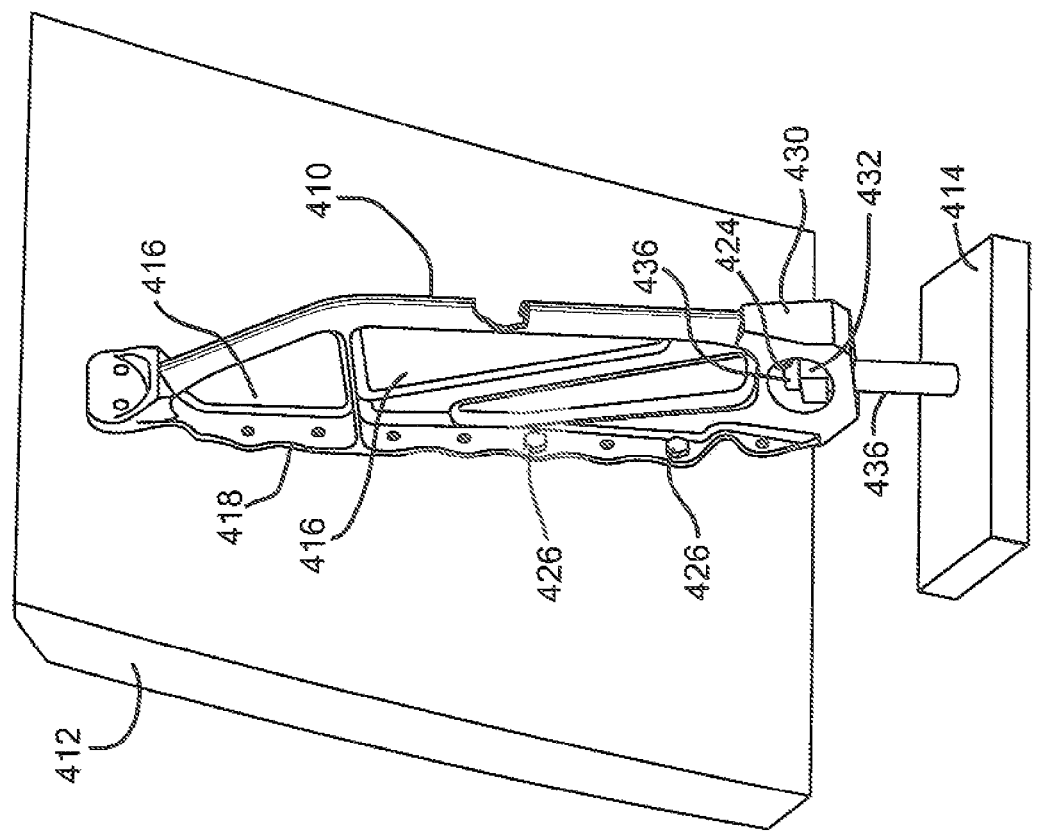
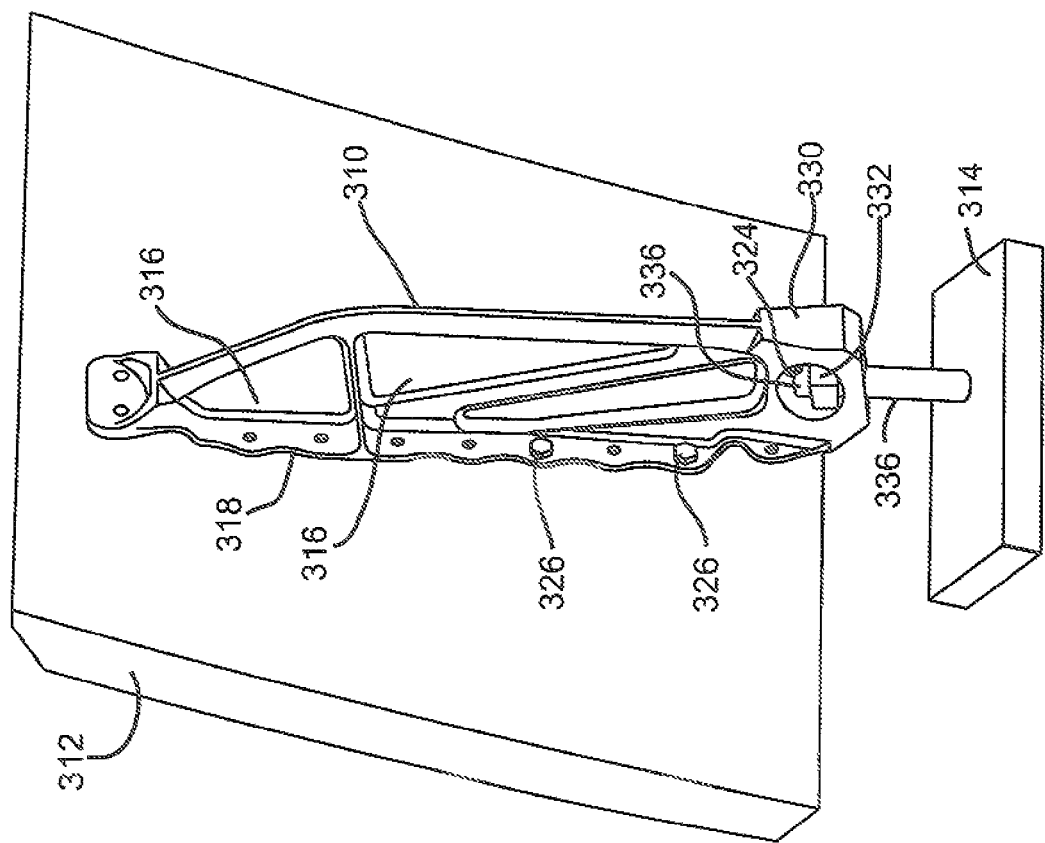

LOADING FITTING HAVING INTERSECTING HOLES IN THE WEB SIDE AND END

BACKGROUND

Many of the existing loading fittings for attaching to one or more supporting structures, such as an aircraft, utilize U-shaped and L-shaped channels to distribute stress and load along the loading fitting. These fittings may be in tension and/or compression and often utilize a threaded nut which must be held by a wrench during attachment of a threaded attachment member of the supporting structure to the threaded nut. However, these fittings may experience one or more of the following problems: high weight; high stress and load concentrations; potential breakdown; fatigue; increased cost; high assembly time; and/or other types of problems.

A loading fitting, and/or method for attaching a loading fitting to a supporting structure, is needed to decrease one or more problems associated with one or more of the existing loading fittings and/or methods of attachment.

SUMMARY

In one aspect of the disclosure, a loading fitting comprises at least one of an I, a T, and a J shaped cross-section having a flange attached to at least one supporting structure.

In another aspect of the disclosure, a method is disclosed for attaching a loading fitting to at least one supporting structure. In one step, a loading fitting is provided comprising at least one of an I, a T, and a J shaped cross-section having a flange. In another step, the loading fitting is loaded to the at least one supporting structure in at least one of tension and compression.

These and other features, aspects and advantages of the disclosure will become better understood with reference to the following drawings, description and claims.

BRIEF DESCRIPTION OF THE DRAWINGS

FIG. 6 shows a perspective view of another embodiment of a loading fitting comprising a substantially T-shaped cross-sectioned web portion having a flange which is adapted to attach to one or more supporting structures;

FIG. 7 shows a perspective view of yet another embodiment of a loading fitting comprising a substantially J-shaped cross-sectioned web portion having a flange which is adapted to attach to one or more supporting structures.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
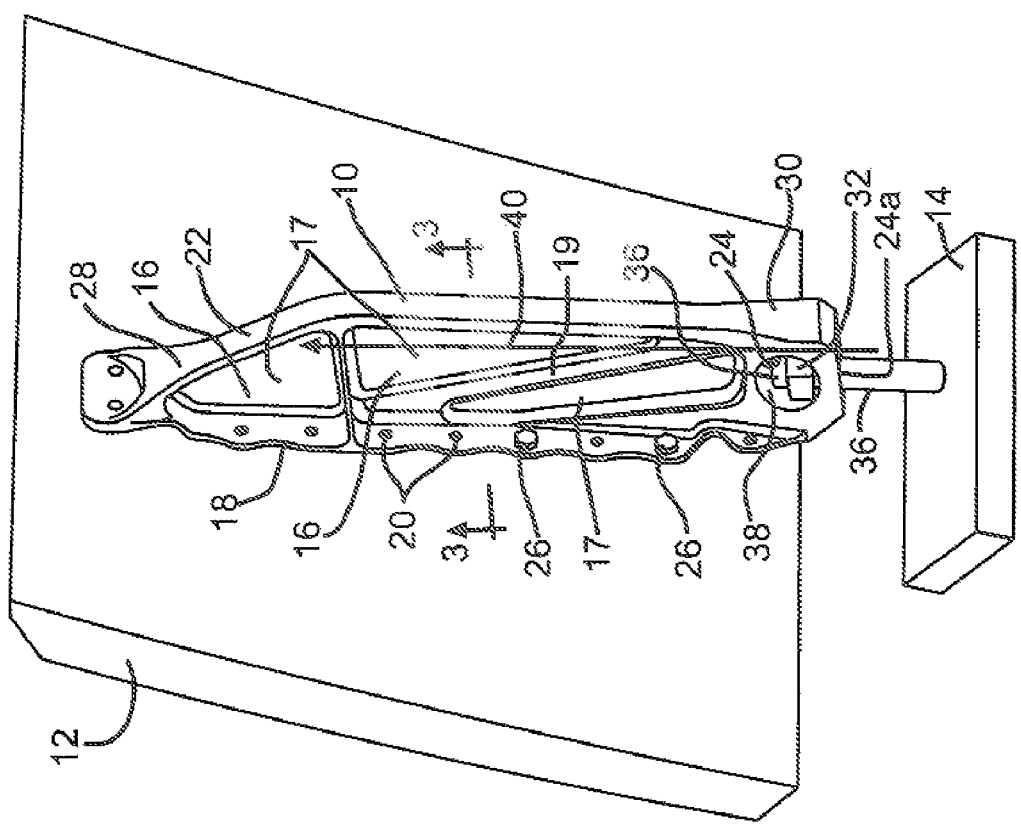
FIG. 1 shows a perspective view of one embodiment of an I-shaped loading fitting attached to supporting structures.

FIG. 1 shows a perspective view of one embodiment of a loading fitting 10 attached to supporting structures 12 and 14. One or more of the supporting structures 12 and 14 may comprise a portion of an aircraft, a wing spar, an engine, a wing rib, a wing-pylon, a wing body joint, a strut, a fuselage, a landing gear, a wing, a fuselage frame, a bulkhead, an aircraft frame, a flap, and/or a skin of an aircraft. In other embodiments, one or more of the supporting structures 12 and 14 may be non-aircraft related structures. In still other embodiments, the loading fitting 10 may be attached to any number and/or type of supporting structures 12 and 14.

Figure 2:
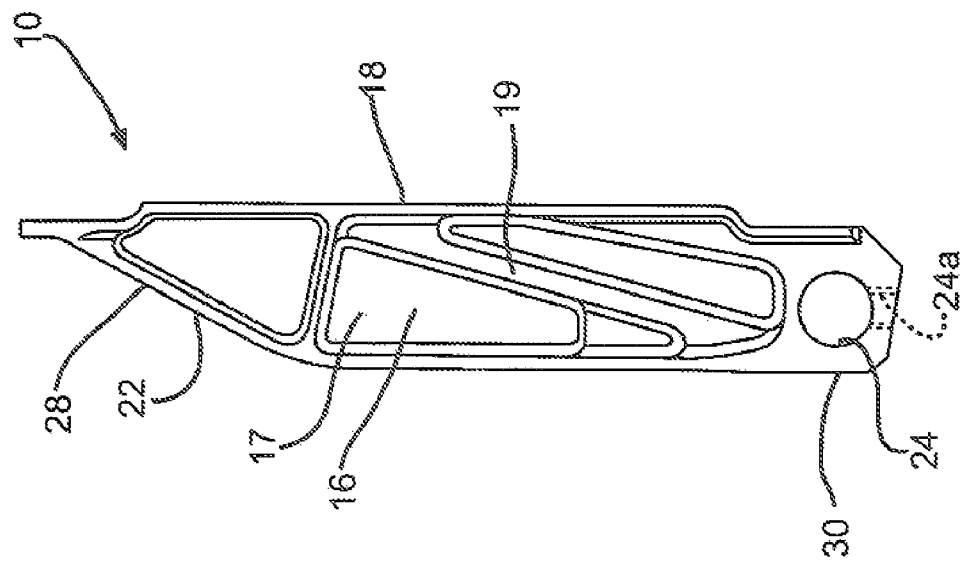
FIG. 2 shows a side-view of the loading fitting of FIG. 1 detached from the supporting structures.
Figure 3:
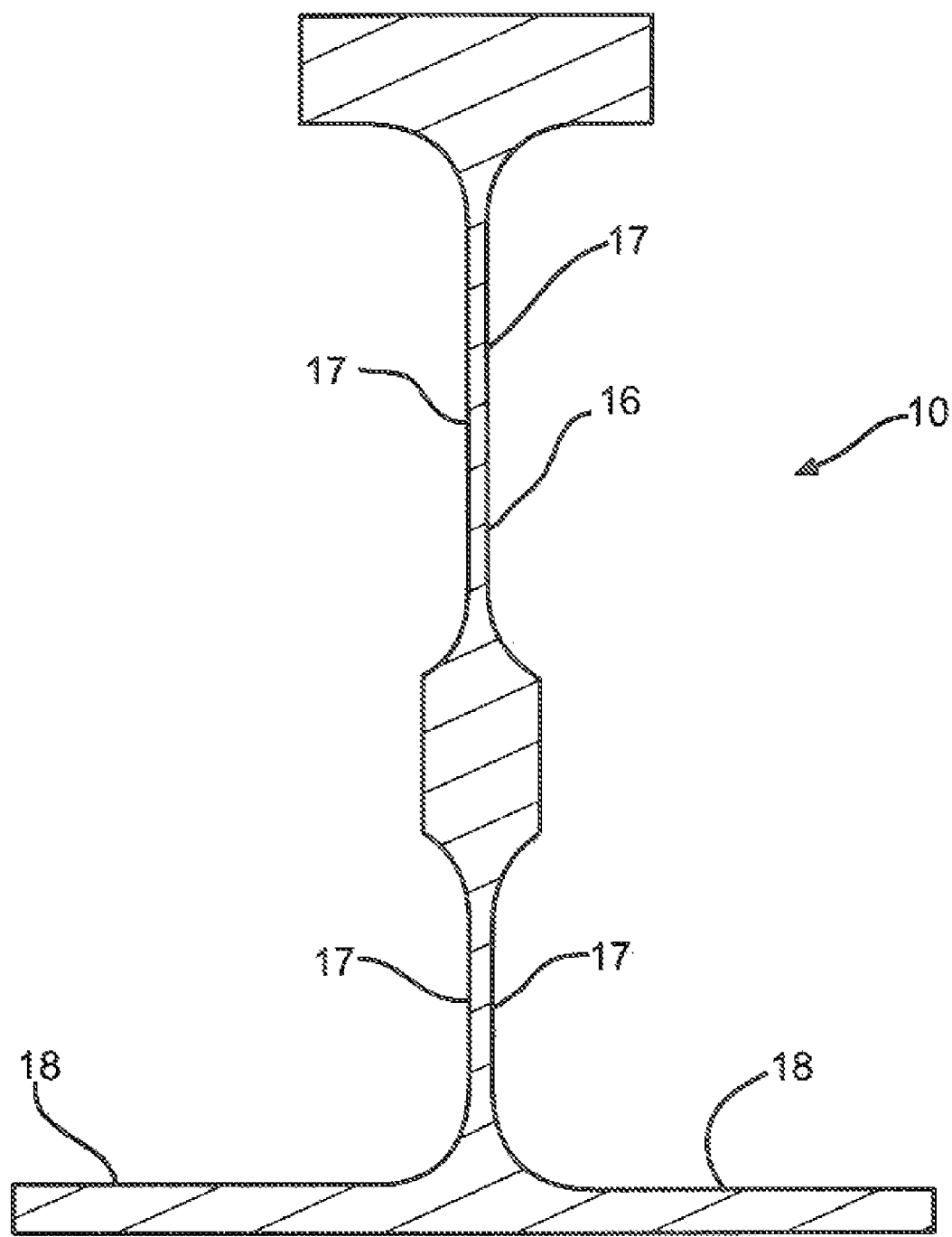
FIG. 3 shows a cross-section view through line 3-3 of the loading fitting of FIG. 2.

FIG. 2 shows a side-view of the loading fitting 10 of FIG. 1 detached from the supporting structures 12 and 14. FIG. 3 shows a cross-section view through line 3-3 of the loading fitting 10 of FIG. 2. As shown in FIGS. 1-3, the loading fitting 10 may comprise a substantially I-shaped cross-sectioned web portion 16, at least one cutout area 17 in the web portion 16, a flange 18 having a plurality of spaced-apart fastener receiving holes 20, one or more ribs 19, a diagonal bracing member 22, and an attachment hole 24. The I-shaped cross-section web portion 16 along with the cutout area 17 in the web portion 16 may reduce the weight of the loading fitting 10 over one or more of the prior art loading fittings by as much as 40 percent, while maintaining high strength and high stiffness. As shown in FIG. 1, the flange 18 may be attached to supporting structure 12 through fasteners 26 which pass through the fastener-receiving holes 20 of the flange 18. The diagonal bracing member 22 may be disposed at one end 28 of the loading fitting 10, and may help to further reduce the weight of the loading fitting 10 while maintaining strength and rigidity.

The attachment hole 24 may be circular in shape and disposed at another end 30 of the loading fitting 10. As shown in FIG. 1, a nut 32 may be disposed within the attachment hole 24. The nut 32 may be threaded and semi-circular. In other embodiments, the nut 32 may comprise a machined nut, a nut, a hilok, and a lockbolt. An attachment member 36 may attach the supporting structure 14 to the loading fitting 10 by extending through hole 24a in the loading fitting 10. The attachment member 36 may comprise a threaded screw which is threaded into the threaded nut 32 disposed within the attachment hole 24. The semi-circular configuration of the threaded nut (barrel nut) 32 within the circular attachment hole 24 may hold the threaded nut 32 in place within the attachment hole 24 without a tool (such as a wrench) being needed during screwing (applying torque) of the threaded screw into the nut 32. This may be due to the nut 32 abutting against the curved surface 38 of the attachment hole 24. In another embodiment, the attachment hole 24 may not be necessary and hole 24a may be threaded to receive a threaded attachment member 36 without the use of a threaded nut 32. In still other embodiments, the loading fitting 10 may be varied in type, size, configuration, and orientation, and/or may be attached to varying types and numbers of supporting structures 12 and 14 through varying mechanisms and/or structures.

The loading fitting 10 may be loaded in tension and/or compression along direction 40 due to the flange 18 being attached to supporting structure 12, and the load of supporting structure 14 being applied to the loading fitting 10 in tension and/or compression in direction 40 due to the attachment member 36 being attached to the nut 32 within the attachment hole 24. The load provided by the attachment member 36 may be transferred through the nut 32 to the curved surface 38 of the attachment hole 24 and may be substantially evenly distributed through the I-shaped cross-sectioned web portion 16 of the loading fitting 10. In other embodiments, the tension and/or compression load may be supplied by an attachment member 36 comprising a bold, a cable, a chain, or another type of attachment member. In still other embodiments, the loading fitting 10 may be loaded in varying manners using varying devices.

Load and stress testing of the loading fitting 10 of FIG. 1 has shown that the loading fitting 10 provides improved load paths, load distribution, and stress distributions over many of the prior art loading fittings. For instance, unlike the high stress and load concentrations in many of the prior art loading fittings, testing has shown that the loading fitting 10 of FIG. 1 distributes the loads and stress throughout the loading fitting.

Figure 4:
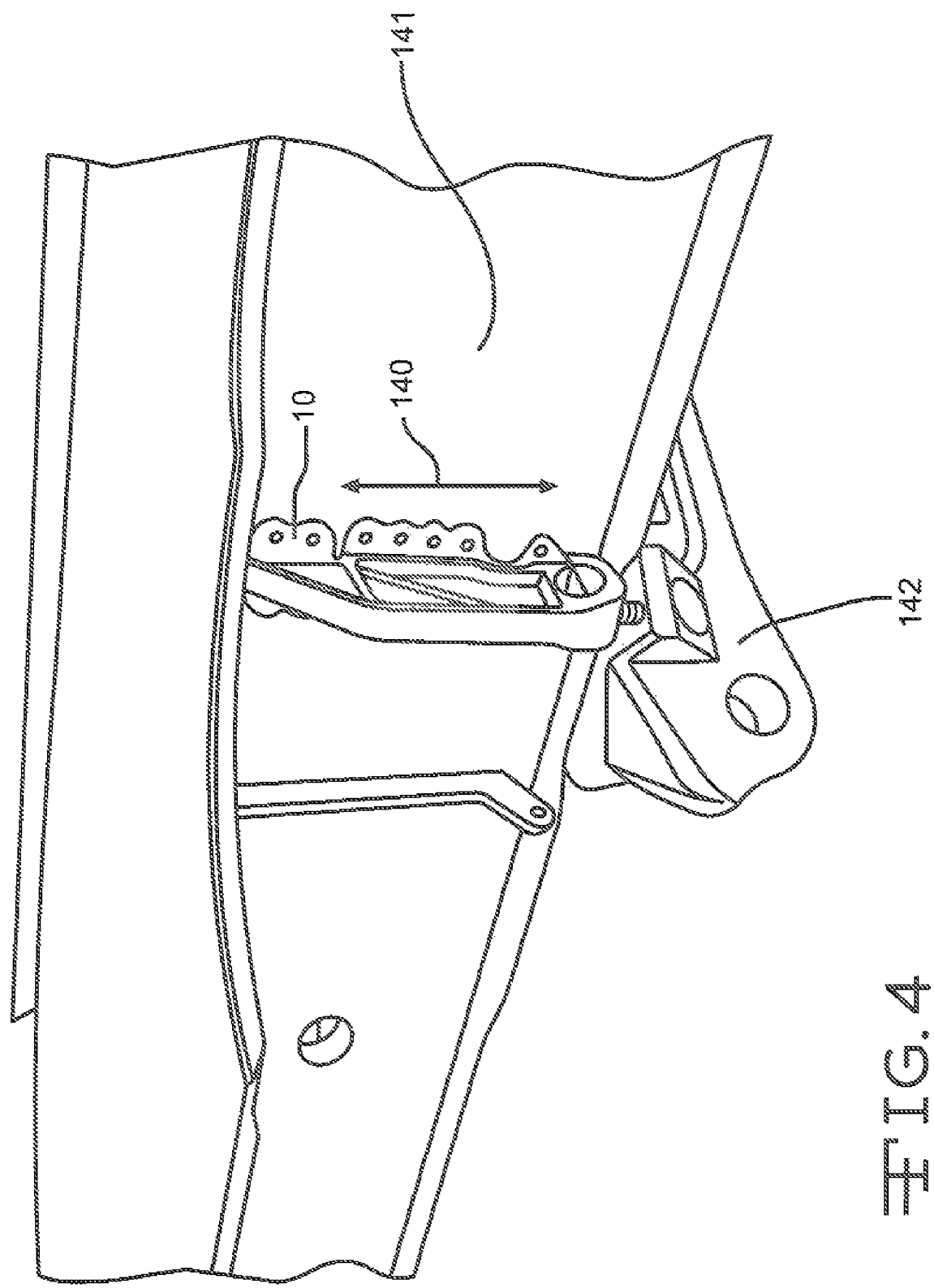
FIG. 4 shows a perspective view of another embodiment of the loading fitting of FIG. 1 attached between an aircraft wing and an aircraft engine supporting structure.
Figure 5:
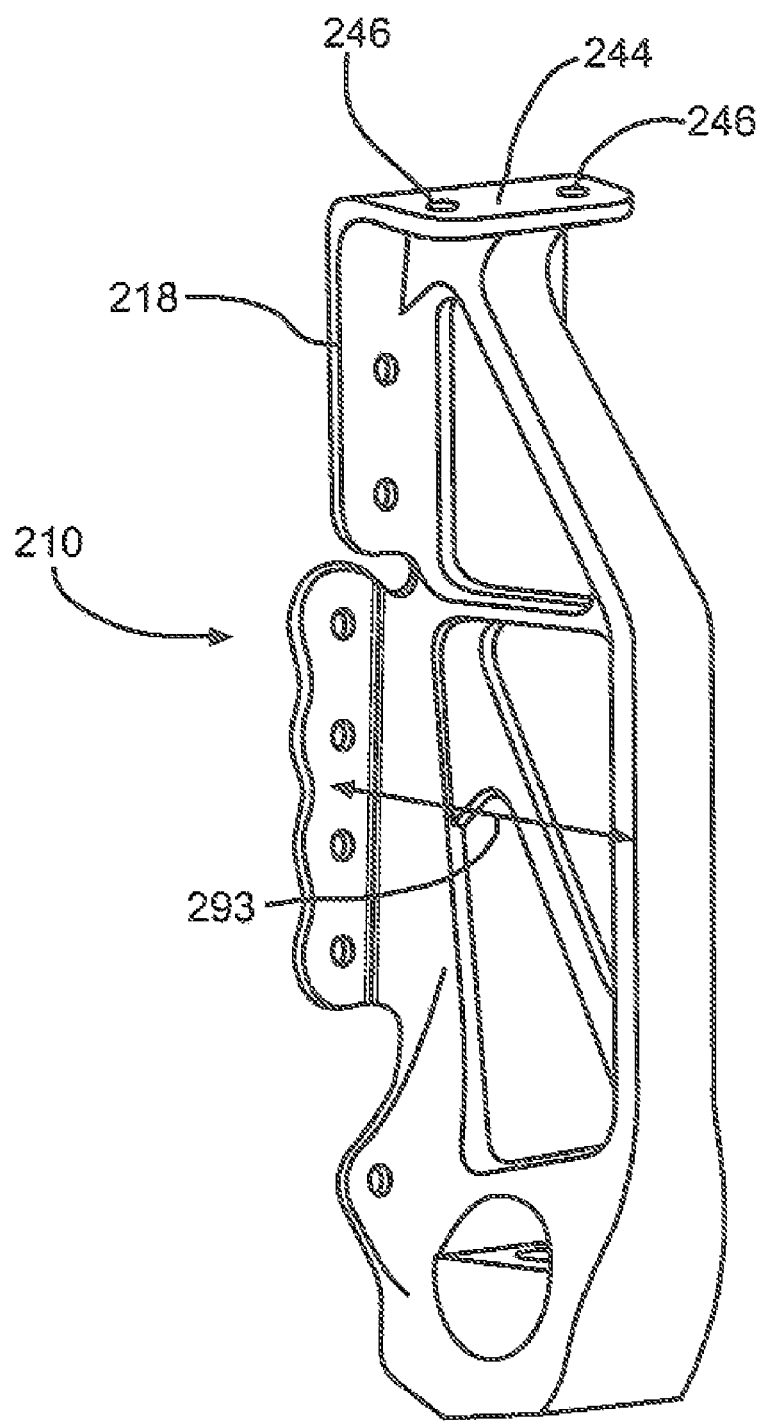
FIG. 5 shows a perspective view of yet another embodiment of an I-shaped loading fitting having a varying configuration over the loading fitting of FIG. 1.

FIG. 4 shows a perspective view of another embodiment of the loading fitting 10 of FIG. 1 attached between an aircraft wing 141 and an aircraft engine supporting structure 142. The loading fitting 10 may transfer tension and/or compression load in direction 140. FIG. 5 shows a perspective view of yet another embodiment of a loading fitting 210 having a varying configuration over the loading fitting 10 of FIG. 1. The loading fitting 210 may be larger in a height direction 293 than the loading fitting 10 of FIG. 1. The loading fitting 210 may further comprise a surface 244 which is substantially perpendicular to the flange 218. A plurality of attachment holes 246 may be disposed in surface 244 for attaching the surface 244 to one or more supporting structures, such as supporting structures 12 and/or 14 of FIG. 1.

FIG. 6 shows a perspective view of another embodiment of a loading fitting 310 comprising a substantially T-shaped cross-sectioned web portion 316. The loading fitting 310 has a flange 318 which is attached to supporting structure 312, and an attachment hole 324 which is attached though attachment member 336 and nut 332 to supporting structure 314. FIG. 7 shows a perspective view of yet another embodiment of a loading fitting 410 comprising a substantially J-shaped cross-sectioned web portion 416. The loading fitting 410 has a flange 418 which is attached to supporting structure 412, and an attachment hole 424 which is attached through attachment member 436 and nut 432 to supporting structure 414. The T and J shaped cross-sectioned web portions 316 and 416 of the embodiments of FIGS. 6 and 7 may provide reduced weight loading fittings 310 and 410 having improved load and stress distribution over one or more loading fittings of the prior art.

Figure 3A:
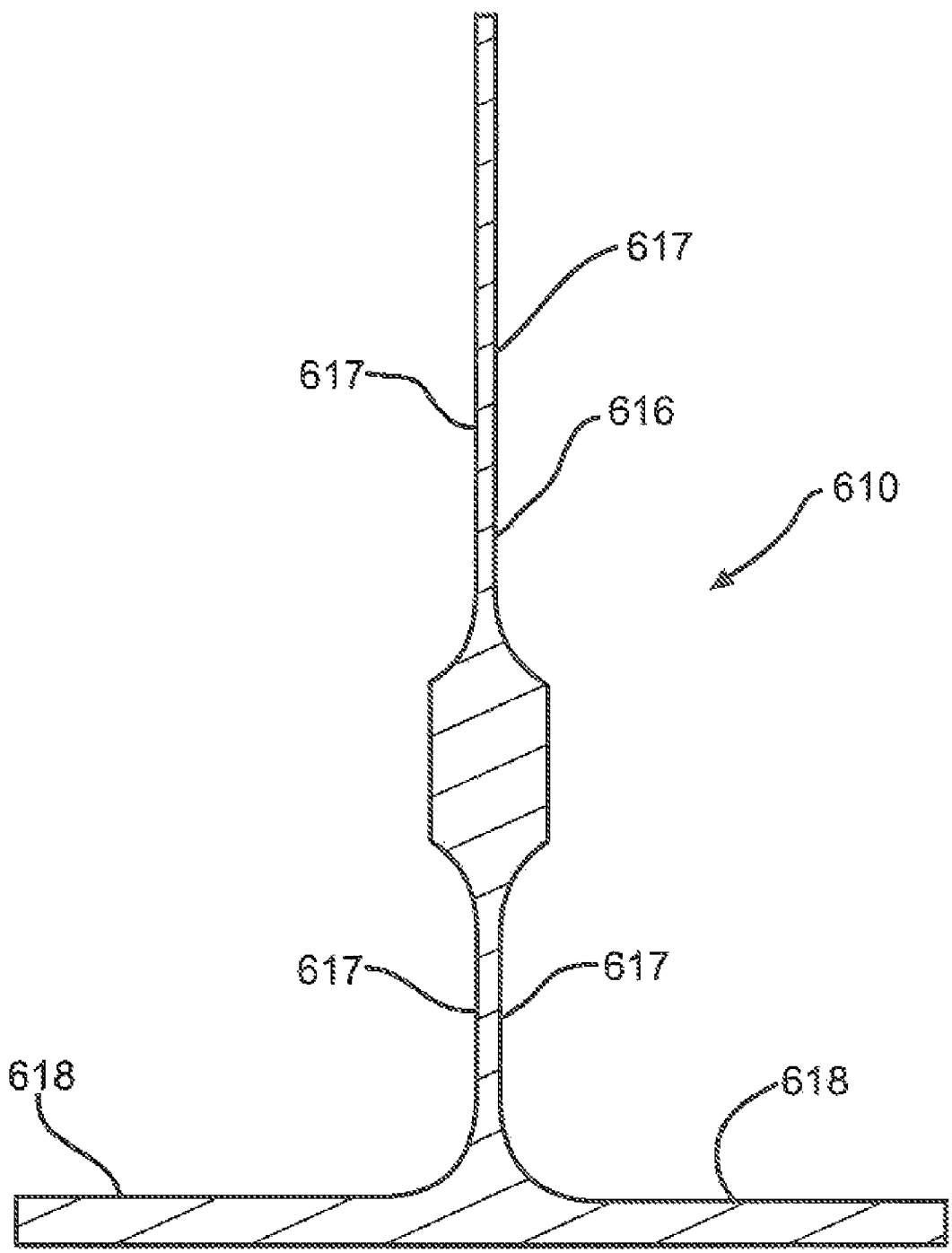
FIG. 3A shows a cross-section view of one embodiment of a T-shaped loading fitting.
Figure 3B:
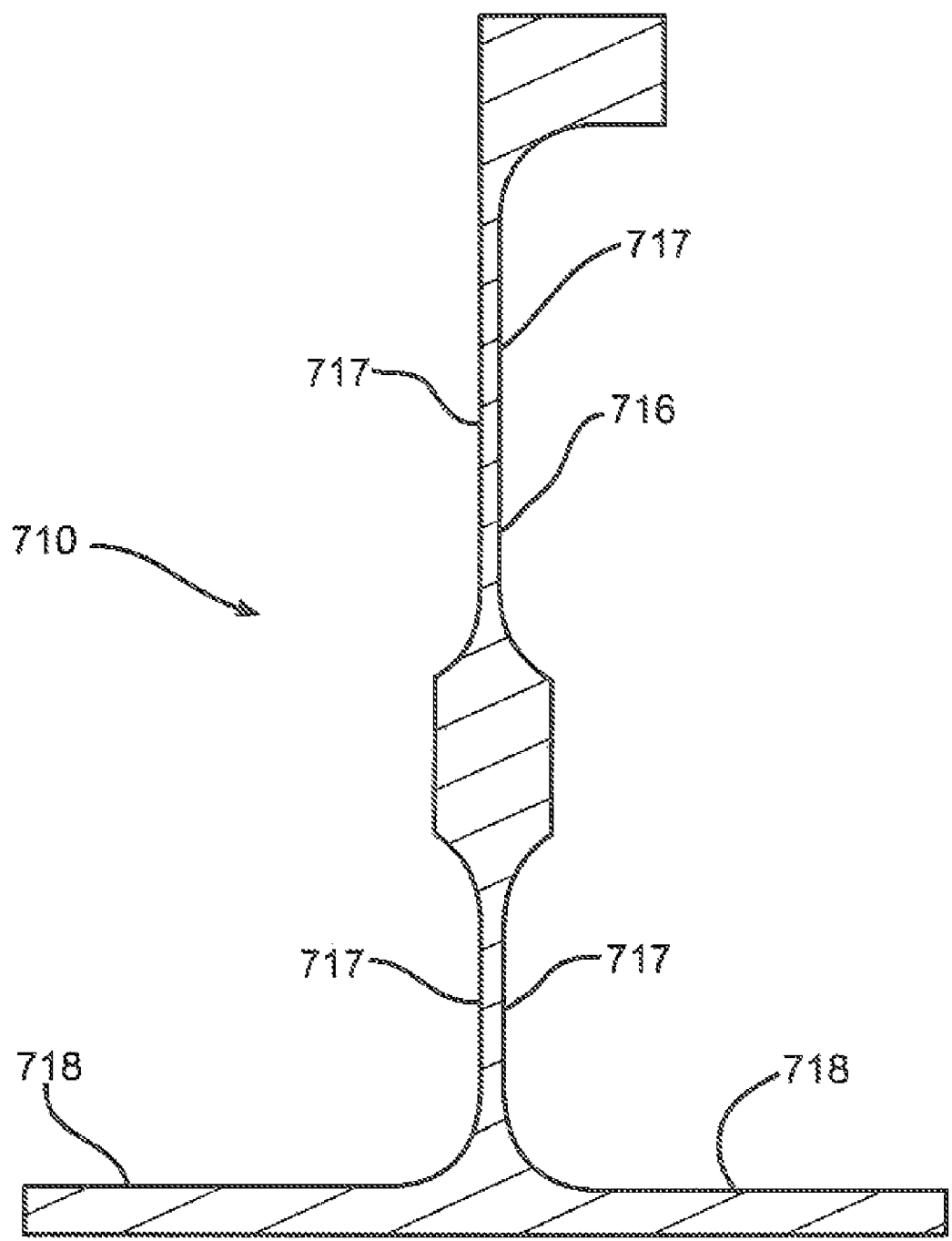
FIG. 3B shows a cross-section view of one embodiment of a J-shaped loading fitting.

FIG. 3A shows a cross-section view of another embodiment of a loading fitting 610 comprising a substantially T-shaped cross-sectioned web portion 616, with cutout areas 617 in the web portion 616, and flanges 618. FIG. 3B shows a cross-section view of yet another embodiment of a loading fitting 710 comprising a substantially J-shaped cross-sectioned web portion 716, with cutout areas 717 in the web portion 716, and flanges 718. The T and J shaped cross-sectioned web portions 616 and 716 of the embodiments of FIGS. 3A and 3B may provide reduced weight loading fittings 610 and 710 having improved load and stress distribution over one or more loading fittings of the prior art.

Figure 8:
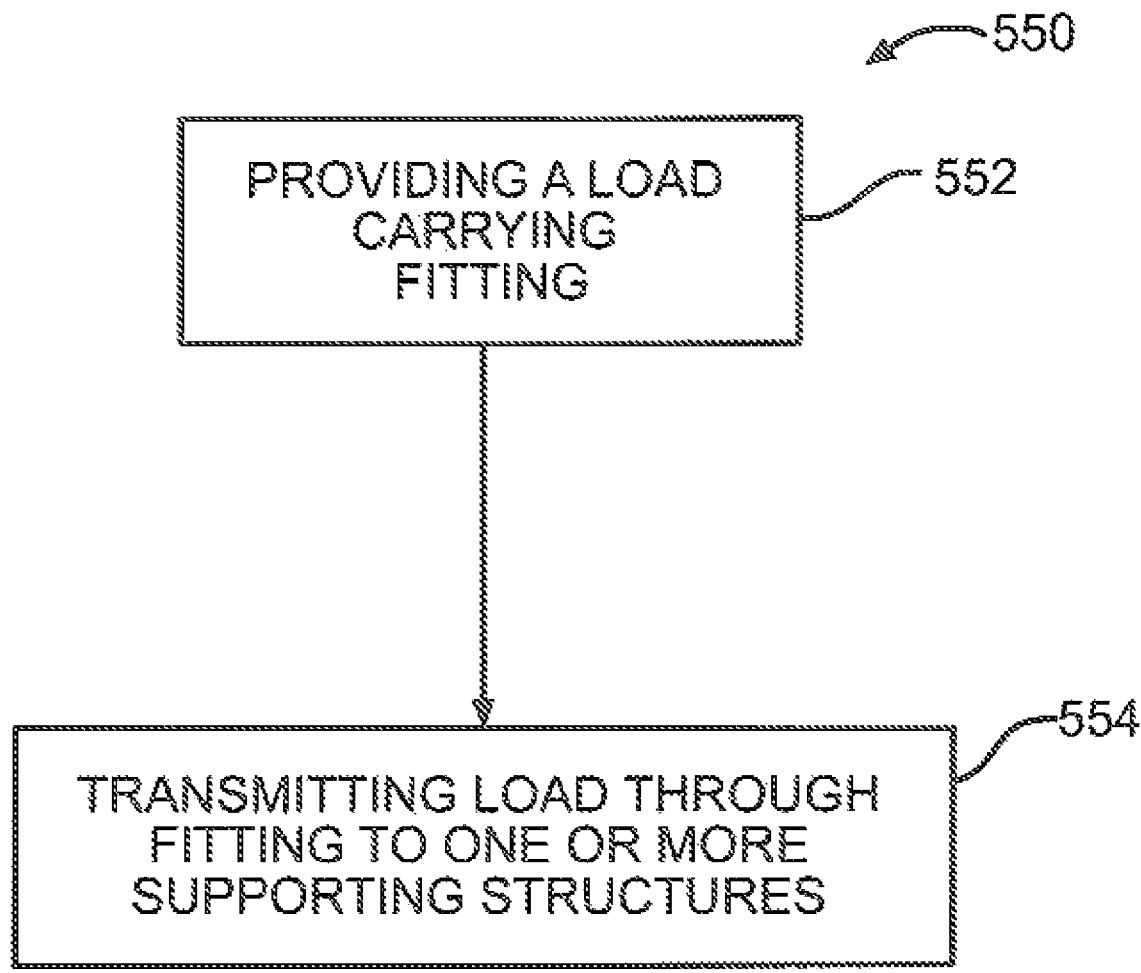
FIG. 8 shows a flowchart of one embodiment of a method for attaching a loading fitting to at least one supporting structure.

FIG. 8 shows a flowchart of one embodiment of a method 550 for attaching a loading fitting 10, 210, 310, 410, 610, and/or 710 to at least one supporting structure 12, 312, 412 and/or 14, 314, 414. In one step 552, a loading fitting 10, 210, 310, 410, 610, and/or 710 is provided. The provided loading fitting 10, 210, 310, 410, 630, and/or 710 may comprise one or more of an I, a T, and a J shaped cross-section 16, 316, 416, 616, and/or 716 having a flange 18, 218, 318, 418, 618, and/or 718. The provided loading fitting 10, 210, 310, 410, 610, and/or 710 may comprise any of the embodiments disclosed herein. In still another step 554, the loading fitting 10, 210, 310, 410, 610, and/or 710 may be loaded in tension and/or compression to the at least one supporting structure 12, 312, 412, and/or 14, 314, 414, which may comprise an aircraft or non-aircraft structure. In one embodiment, step 554 may comprise disposing a nut 32, 332, 432 which may be semi-circular, within a hole 24, 324, 424 which may be circular, at an end 30, 330, 430 of the loading fitting 10, 210, 310, and/or 410, and attaching an attachment member 36, 336, 436 through the hole 24, 324, 424 to the nut 32, 332, 432. In still another embodiment, step 554 may comprise attaching a plurality of spaced-apart fasteners 26, 326, 426 to a flange 18, 218, 318, and/or 418 of the loading fitting 10, 210, 310, and/or 410. In another embodiment, step 554 may comprise tension and/of compression load being applied by an attachment member 36, 336, 436 comprising at least one of a bolt, a cable, and a chain. In yet another embodiment, step 554 may comprise screwing an attachment member 36, 336, 436 into a threaded hole 24, 324, 424 at an end 30, 330, 430 of the loading fitting 10, 210, 310, and/or 410.

One or more of the embodiments disclosed herein may reduce one or more of the problems of one or more of the prior art loading fittings and/or methods for attaching a loading fitting. For instance, one or more of the embodiments disclosed herein may provide a loading fitting having one or more of the following properties: reduced weight; allowing for the attachment of an attachment member to a nut of the loading fitting without the use of a tool to hold the nut in place; reduced time of installation; reduced fuel costs due to the lighter weight of the loading fitting; increased payload due to the lighter weight of the loading fitting; increased range of an aircraft due to the lighter weight of the loading fitting; more uniform stress and load distribution; high strength and stiffness; reduced likelihood of breakdown; reduced fatigue; and/or which may provide one or more other types of improvements over one or more of the prior art loading fittings and/or methods for attaching a loading fitting.

It should be understood, of course, that the foregoing relates the exemplary embodiments of the disclosure and that modifications may be made without departing from the spirit and scope of the disclosure as set forth in the following claims.

The invention claimed is:

1. A loading fitting comprising a web portion extending from a middle portion of a flange with opposed sides of the flange being disposed on opposite sides of the web portion, a first hole disposed in at least one of the opposite sides of the web portion, and a second hole, intersecting the first hole, disposed in an end surface of the web portion, wherein the loading fitting is configured to be loaded in, at separate times, each of tension and compression acting lengthwise along the web portion when the loading fitting is attached to and between first and second supporting structures with the flange configured to attach to the first supporting structure and at least one of the first and second holes configured to attach to the second supporting structure.

2. The loading fitting of claim 1 wherein the loading fitting is attached to and between the first and second supporting structures and loaded in at least one of tension or compression acting lengthwise along the web portion.

3. The loading fitting of claim 2 wherein the load is supplied by at least one of a bolt, a cable, or a chain attached to and between the second supporting structure and the loading fitting.

4. The loading fitting of claim 2 wherein the first and second supporting structures comprise parts of an aircraft.

5. The loading fitting of claim 4 wherein the first and second supporting structures comprise at least one of a wing spar, an engine, a wing rib, a wing-pylon, a wing body joint, a strut, a fuselage, a landing gear, a wing, a fuselage frame, a bulkhead, an aircraft frame, a flap, or a skin of the aircraft.

6. The loading fitting of claim 1 wherein the web portion further comprises a bracing member.

7. The loading fitting of claim 6 wherein the bracing member diagonally extends across the web portion, and is disposed at one end of the web portion.

8. The loading fitting of claim 1 wherein the first hole is configured to hold a first member, attached to the second supporting structure, between opposed surfaces of the first hole so that when the first member is disposed against one of the opposed surfaces of the first hole the loading fitting is loaded in tension acting lengthwise along the web portion, and when the first member is disposed against the other of the opposed surfaces of the first hole the loading fitting is loaded in compression acting lengthwise along the web portion.

9. The loading fitting of claim 8 wherein the first hole is holding the first member, attached to the second supporting structure, between the opposed surfaces of the first hole so that when the first member is disposed against the one opposed surface of the first hole the loading fitting is loaded in tension acting lengthwise along the web portion, and when the first member is disposed against the other opposed surface of the first hole the loading fitting is loaded in compression acting lengthwise along the web portion.

10. The loading fitting of claim 9 wherein the first member comprises at least one of a locking device, a nut, or a hilok.

11. The loading fitting of claim 9 wherein a second member, attached to the second supporting structure, is extended through the second hole into the first hole with the first member attached to the second member.

12. The loading fitting of claim 11 wherein the second member comprises at least one of a bolt, a cable, or a chain.

13. The loading fitting of claim 1 further comprising at least one cutout area in the web portion.

14. The loading fitting of claim 1 further comprising a plurality of fastening devices spaced along the flange for attaching the flange to the first supporting structure.

15. The loading fitting of claim 14 wherein the plurality of fastening devices comprise a plurality of fastener receiving holes spaced along the flange for attaching the flange to the first supporting structure.

16. The loading fitting of claim 1 further comprising at least one rib protruding from the web portion.

17. The loading fitting of claim 1 wherein the flange and the web portion form a capital I shape with the flange forming a top portion of the capital I shape and another end of the web portion forming a bottom portion of the capital I shape.

18. The loading fitting of claim 1 wherein the flange and the web portion form a capital J shape with the flange forming a top portion of the capital J shape and another end of the web portion forming a bottom portion of the capital J shape.

19. The loading fitting of claim 1 wherein the flange and the web portion form a capital T shape with the flange forming a top portion of the capital T shape and the web portion extending in a linear plane to form a bottom portion of the capital T shape.

20. A method for attaching a loading fitting between supporting structures comprising:
providing a loading fitting comprising a web portion extending from a middle portion of a flange with opposed sides of the flange being disposed on opposite sides of the web portion, a first hole disposed in at least one of the opposite sides of the web portion, and a second hole, interesting the first hole, disposed in an end surface of the web portion;
attaching the loading fitting to and between first and second supporting structures with the flange attached to the first supporting structure, and at least one of the first and second holes attached to the second supporting structure; and
loading the loading fitting, at separate times, in each of tension and compression acting lengthwise along the web portion while the loading fitting is attached to and between the first and second supporting structures.

21. The method of claim 20 wherein the first and second supporting structures comprise parts of an aircraft.

22. The method of claim 20 wherein the attaching further comprises attaching at least one of a bolt, a cable, or a chain to and between at least one of the first and second holes of the web portion and the second supporting structure.

23. The method of claim 20 wherein the attaching further comprises disposing a first member within the first hole, extending a second member, attached to the second supporting structure, through the second hole into the first hole, and attaching the first member to the second member in the first hole.

24. The method of claim 23 wherein the first member comprises at least one of a locking device, a nut, or a hilok, and the second member comprises at least one of a bolt, a cable, or a chain.

25. The method of claim 23 wherein the loading comprises loading the loading fitting, at one point in time, in tension, acting lengthwise along the web portion, due to the first member being forced against one surface of the first hole, and wherein the loading further comprises loading the loading fitting, at another point in time, in compression, acting lengthwise along the web portion, due to the first member being forced against a second opposed surface of the first hole.

26. The method of claim 20 wherein the provided loading fitting further comprises a plurality of fastening devices spaced along the flange for attaching the flange to the first supporting structure, and wherein the attaching further comprises attaching a plurality of spaced-apart fasteners between the first supporting structure and the flange of the loading fitting using the plurality of fastening devices.

27. The method of claim 26 wherein the plurality of fastening devices comprise a plurality of fastener-receiving holes spaced along the flange.

28. The method of claim 20 wherein the provided loading fitting comprises a web portion comprising a bracing member.

29. The method of claim 28 wherein the bracing member diagonally extends across the web portion.

30. The method of claim 20 wherein the web portion of the provided loading fitting further comprises at least one cutout area.

31. The method of claim 20 wherein the web portion of the provided loading fitting further comprises at least one protruding rib.

32. The method of claim 20 wherein the flange and the web portion form a capital I shape with the flange forming a top portion of the capital I shape and another end of the web portion forming a bottom portion of the capital I shape.

33. The method of claim 20 wherein the flange and the web portion form a capital J shape with the flange forming a top portion of the capital J shape and another end of the web portion forming a bottom portion of the capital J shape.

34. The method of claim 20 wherein the flange and the web portion form a capital T shape with the flange forming a top portion of the capital T shape and the web portion extending in a linear plane to form a bottom portion of the capital T shape.

35. A loading fitting comprising a web portion extending from a middle portion of a flange with opposed sides of the flange being disposed on opposite sides of the web portion, wherein a flange of the loading fitting is attached to a first supporting structure, and at least one of a bolt, a cable, or a chain is attached to and between the loading fitting and a second supporting structure, with the at least one bolt, cable, or chain loading the loading fitting, at separate times, in each of tension and compression acting lengthwise along the web portion; and
- at least one of: (1) the web portion comprises a bracing member; (2) a plurality of fastening devices are spaced along the flange attaching the flange to the first supporting structure; (3) at least one rib protrudes from the web portion; or (4) a first hole is disposed in at least one of the opposite sides of the web portion attaching the loading fitting to the second support structure.

36. The loading fitting of claim 35 wherein the web portion comprises the bracing member.

37. The loading fitting of claim 35 wherein the plurality of fastening devices are spaced along the flange attaching the flange to the first supporting structure.

38. The loading fitting of claim 35 wherein the at least one rib protrudes from the web portion.

39. The loading fitting of claim 35 wherein the first hole is disposed in at least one of the opposite sides of the web portion attaching the loading fitting to the second support structure.

40. A loading fitting comprising a web portion extending from a middle portion of a flange with opposed sides of the flange being disposed on opposite sides of the web portion, and a first hole disposed in at least one of the opposites sides of the web portion, wherein the flange is attached to a first supporting structure, the first hole holds a first member between opposed surfaces of the first hole, the first member, comprising at least one of a locking device, a nut, or a hilok, is attached to a second supporting structure, when the first member is disposed against one of the opposed surfaces of the first hole the loading fitting is loaded in tension acting lengthwise along the web portion, and when the first member is disposed against the other opposed surface of the first hole the loading fitting is loaded in compression acting lengthwise along the web portion.

41. A loading fitting comprising a web portion extending from a middle portion of a flange with opposed sides of the flange being disposed on opposite sides of the web portion, and a first hole disposed in at least one of the opposites sides of the web portion, wherein the flange is attached to a first supporting structure, the first hole holds a first member between opposed surfaces of the first hole, the first member, comprising at least one of a locking device, a nut, or a hilok, is attached to a second member extending through a second hole disposed in an end surface of the web portion into the first hole, the second member is attached to a second supporting structure, and when the first member is disposed against one opposed surface of the first hole the loading fitting is loaded in tension acting lengthwise along the web portion, and when the first member is disposed against the other opposed surface of the first hole the loading fitting is loaded in compression acting lengthwise along the web portion.

* * * * *